(12) United States Patent
Korus

(10) Patent No.: US 6,343,992 B2
(45) Date of Patent: Feb. 5, 2002

(54) DRIVER COUPLER

(75) Inventor: Thomas J. Korus, Lindsay, NE (US)

(73) Assignee: Lindsay Manufacturing Co., Lindsay, NE (US)

( * ) Notice: Subject to any disclaimer, the term of this patent is extended or adjusted under 35 U.S.C. 154(b) by 0 days.

(21) Appl. No.: 09/779,945

(22) Filed: Feb. 9, 2001

Related U.S. Application Data

(63) Continuation of application No. 09/143,981, filed on Aug. 31, 1998, now Pat. No. 6,231,450.

(51) Int. Cl.⁷ ................................................. F16D 3/68
(52) U.S. Cl. ......................................... 464/74; 403/257
(58) Field of Search ............................ 464/73, 74, 76, 464/81, 82, 83, 85, 90, 147, 158, 901; 403/256, 257, 258, 260, 296, 359.1, 373, 374.1

(56) References Cited

U.S. PATENT DOCUMENTS

| 519,454 A | * | 5/1894 | Holland ........................ 279/44 |
| 1,274,254 A | * | 7/1918 | Fleek .......................... 464/158 |
| 1,378,319 A | * | 5/1921 | Brooks ...................... 279/44 X |
| 1,953,063 A | * | 4/1934 | Coultas ...................... 464/901 X |
| 3,094,853 A | * | 6/1963 | Boschi ....................... 464/83 X |
| 3,298,197 A | * | 1/1967 | Roth ........................ 464/901 X |
| 4,787,878 A | * | 11/1988 | Nikkel ........................ 464/83 |
| 6,155,743 A | * | 12/2000 | Chen ................... 403/374.3 X |

\* cited by examiner

Primary Examiner—Lynne H. Browne
Assistant Examiner—Greg Binda
(74) Attorney, Agent, or Firm—Cook, Alex, McFarron, Manzo, Cummings & Mehler, Ltd.

(57) ABSTRACT

A coupler for connecting first and second shafts has a male cross member pinned to the first shaft and a female body member clamped onto the second shaft. The female body member has a housing with internal splines interlocking with mating external splines on the cross member. A longitudinally split clamp has a sill portion integral with the female body member and a half clamp member engageable with the sill portion. The split clamp has a single locking bolt which reduces the time required for installation. The external splines are relieved at one end to allow the coupler to tolerate some misalignment between the shafts.

21 Claims, 2 Drawing Sheets

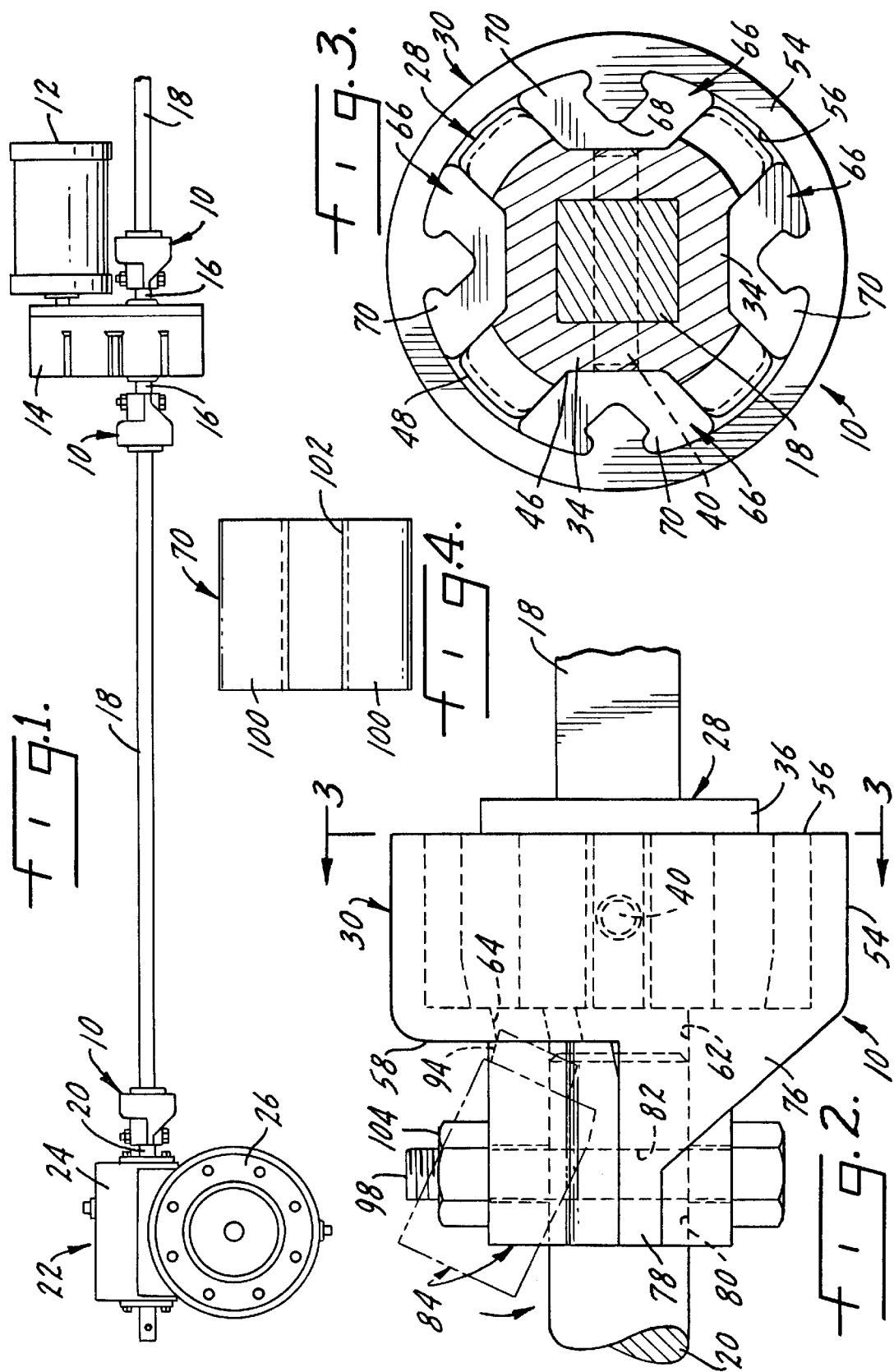

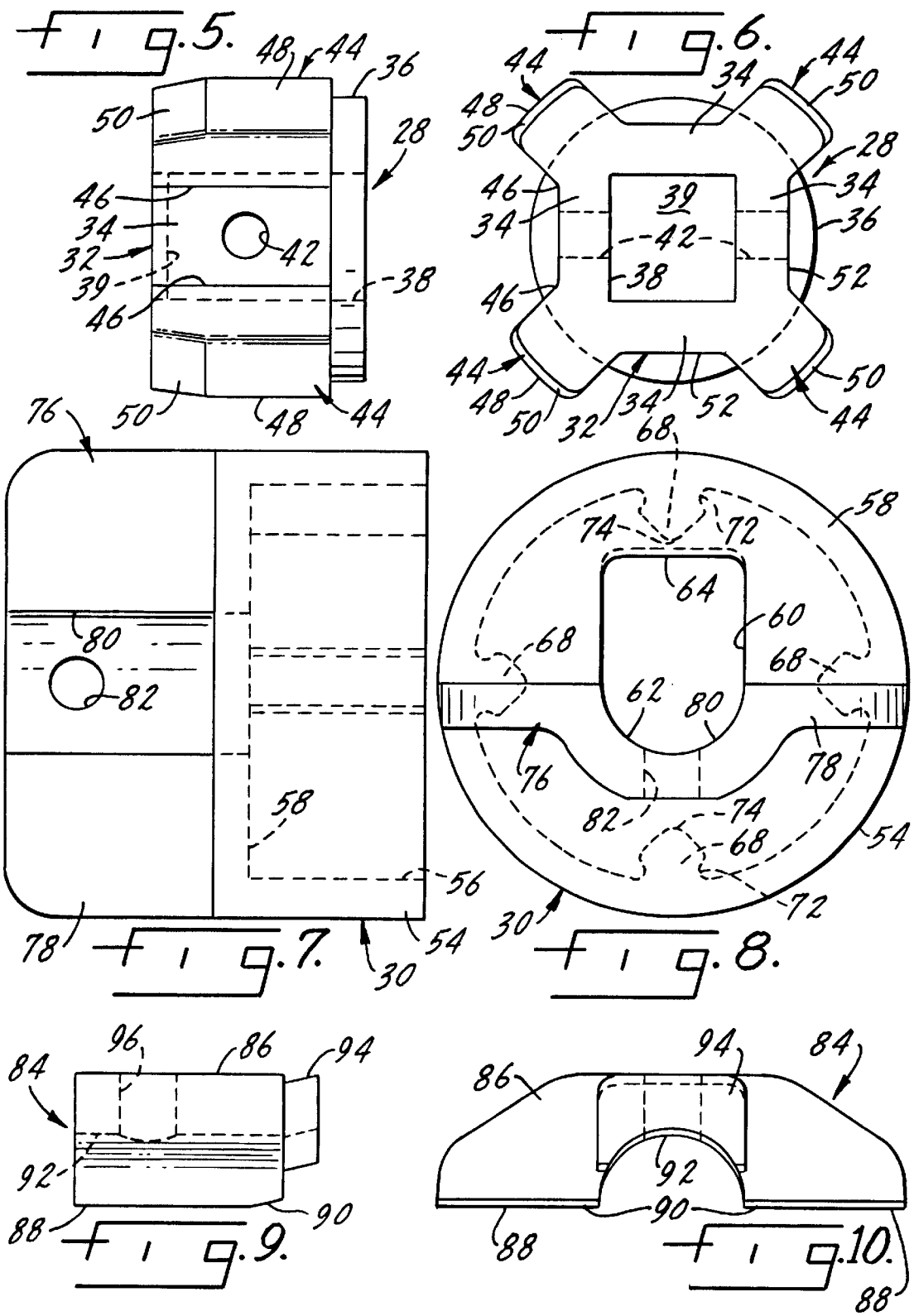

DRIVER COUPLER

This application is a continuation of application Ser. No. 09/143,981 filed on Aug. 31, 1998 now U.S. Pat. No. 6,231,450.

BACKGROUND OF THE INVENTION

This invention relates to couplers for connecting two shafts together for the purpose of transferring rotational motion from one shaft to the other. The coupler has particular application in the agricultural irrigation field where irrigation pipeline support towers have centrally located drive motors for propelling wheels located at the ends of the towers. The motor's gear box is connected to worm drives at the wheels by drive shafts. Drive couplers are used to connect the drive shaft to both the motor gear box and the worm drives. Of course couplers could also be used in other applications where two generally aligned but spaced shafts have to be connected such that rotational motion of one shaft is transferred to the other. Additionally, it is quite often desirable that the coupler be able to tolerate some degree of misalignment between the shafts. Misalignment usually takes the form of the shafts not being parallel to one another.

The invention is particularly concerned with situations where the ends of the shafts remote from the coupler have to be fixed in position prior to installing the coupler. Accordingly, the shafts have no axial movement and perhaps little or no transverse movement available with the result that the coupler has to be installed generally between and/or around the pre-installed shafts.

Prior art couplers of the above type are known as split couplers and have what might be described as a built-up construction wherein a plurality of arms are placed about the end of a shaft and bolted together. The arms extend beyond the end of the shaft where they intersect with the arms of the opposite shaft or some intervening third part in some sort of engagement. Sometimes a rubber connecting block is involved to accommodate misalignment but this leads to problems with the rubber block adding lots of torsional movement called wind-up, with attendant backlash problems. In addition to wind-up, a major problem with the built-up construction is the high number of components and the large number of fasteners required. The high part count adds to cost and installation time.

SUMMARY OF THE INVENTION

The present invention concerns a coupler for transmitting rotational motion from one shaft to an adjacent but spaced shaft. A primary object of the invention is a coupler whose installation can be completed after that of the shafts and with a minimal number of parts.

Another object of the invention is a coupler of the type described which can accommodate misalignment of the shafts.

A further object of the invention is a coupler that reduces lost torsional movement or wind-up.

These and other objects which may become apparent in the following specification are realized by a coupler for connecting first and second shafts. The coupler has first and second connector elements attached to the ends of the respective shafts. The connector elements each include a plurality of splines defining grooves therebetween. One set of splines is internal and the other external such that the splines of one connector element fit into the grooves of the other connector element to interlock the connector elements in rotationally-driving relation. A sill is attached to the second connector element and defines a pocket into which an end portion of the second shaft can be placed by means of a non-axial relative movement between the sill and second shaft. A clamp member is engageable with the sill to enclose the end portion of the second shaft and fix the shaft in rotationally-driving relation with the second connector element. The clamp has a lug which fits into a slot formed in an end wall of the second connector element.

BRIEF DESCRIPTION OF THE DRAWINGS

FIG. 1 is a side elevation view of a portion of the drive system of an agricultural irrigation machine, showing three of the couplers of the present invention.

FIG. 2 is an enlarged side elevation view of the coupler assembly, showing the clamp both in phantom and solid lines to illustrate its installation procedure.

FIG. 3 is a section taken along line 3—3 of FIG. 2.

FIG. 4 is a side elevation view of a wear pad.

FIG. 5 is a side elevation view of a connector element in the form of a male cross piece.

FIG. 6 is an end elevation view of the cross piece of FIG. 5.

FIG. 7 is a top plan view of a connector element in the form of a female body.

FIG. 8 is an end elevation view of the female body.

FIG. 9 is a side elevation view of a clamp.

FIG. 10 is an end elevation view of the clamp.

DETAILED DESCRIPTION OF THE INVENTION

FIG. 1 illustrates the drive coupler 10 of the present invention as applied to the propulsion system of a support tower for an agricultural irrigation machine. That system includes an electric motor 12 mounted near the center of the tower and coupled to a gear box 14. The gear box has two output shafts 16, one on each side of the box. Each output shaft 16 is connected by a coupler 10 to a square drive shaft 18. The drive shafts 18 extend to the ends of the tower where they are connected by a coupler 10 to an input shaft 20 of a wheel box 22 (only one of a tower's two wheel boxes in seen in FIG. 1). The wheel box 22 includes a worm gear 24 driving a hub 26 to which a wheel (not shown) is attached.

FIGS. 2 and 3 show the assembly of the coupler 10. Generally, the coupler comprises first and second connector elements 28 and 30 in the form of a male cross piece and a female body member. The first connector element 28 fits on the end of the square drive shaft 18 while the second connector element 30 is fastened to the input shaft 20. The cross piece fits within the body member in interlocking engagement as will be explained below. The first and second connector elements are preferably die-cast aluminum, although other materials and fabrication methods are possible.

Turning now to FIGS. 5 and 6, details of the first connector element 28 will be described. Element 28 has a body 32 including four walls 34 and a circular stop or flange 36 at one end. As seen in FIG. 6, the stop 36 has a diameter larger than the outside perimeter of the walls 34. The walls 34 define a central socket 38. The socket extends through the stop 36 but is closed off at the opposite end by an end wall 39. The socket is sized and shaped to receive the drive shaft 18 therein. Thus, in the illustrated embodiment the socket matches the square cross section of the drive shaft. The body 32 is retained on the shaft by a cross pin 40 (FIG. 3) which extends through aligned holes 42 in two of the walls 34 and an aligned opening in the end of the shaft 18. Alternately the body 32 could be fixed to the shaft by staking, swaging, set screw or other suitable method.

Extending from the body 32 are four splines 44. Each spline has a root 46 located at a corner of the intersecting walls 34. The spline extends radially to a distal or free end 48, giving the element a cross shape when viewed endwise as in FIG. 6. FIG. 5 illustrates that each spline extends axially from the stop 36 to a taper or relief 50 at the opposite end of the body. The clearances between the mating parts of the coupler, together with the taper 50, permit the coupler to run with a slight misalignment between the shafts. The design shown has been found to tolerate between three and five degrees angularity between the shafts. The splines 44 define a groove or channel 52 between them.

Details of the second connector element 30 can be seen in FIGS. 7 and 8. This connector element includes a cylindrical housing 54 having an open end at 56 and a closed end at wall 58. The wall has an aperture 60 therethrough with a semi-circular bottom edge 62 and an angled top edge 64. The housing 54 defines a cavity into which four internal splines 66 (FIG. 3) extend. The splines 66 have an anchor portion 68 and a wear pad or cushion 70. The splines include a root 72 at the anchor and a free end 74 on the pad. Details of the wear pad 70 will be described below.

The second connector element 30 further includes a sill 76 integrally formed on the wall 58 on the side opposite the housing 54. The sill terminates at a ledge 78 which has a central depression forming a pocket 80. The pocket aligns with and conforms to the shape of the bottom edge 62 of the aperture 60. A bore 82 extends through the ledge 78 at the base of the pocket 80.

A clamp 84 is shown in FIGS. 9 and 10. The clamp has a body 86 with flat bottom surfaces 88 engageable with the ledge 78 of sill 76. One edge of surfaces 88 is beveled as at 90 to facilitate installation of the clamp. A central, semi-circular groove 92 extends through the body. Just above the groove, on one side of the body is an upwardly angled lug 94. The lug has a semi-circular cutout on its underside. The cutout is aligned with the groove 92. The angle of the lug matches the angled top edge 64 of the aperture 60. A bore 96 extends through the body of the clamp for receiving a retention bolt 98 (FIG. 2). Bolt 98 also extends through a hole in the input shaft 20 and through the bore 82 in the sill. It is held in place by a nut 104.

The wear pads or cushions 70 are shown in FIGS. 3 and 4. Each pad has a pair of legs 100 which define a channel 102 in the shape of the anchor 68. Thus, the pads 70 slide lengthwise onto an anchor 68 as best seen in FIG. 3. The pads are preferably made of urethane having a Shore D 75 durometer. The pads leave a space between them which is just wide enough to accept a spline 44 of the cross piece 28 in a snug fit. Similarly, the channels 52 have a size and shape that receives the splines 66 in interlocking engagement.

The use, operation and function of the coupler are as follows. A common situation encountered in assembly of drive couplers is the need to assemble a portion of the drive train in between two components of the drive train which are already fixed in position. In terms of the drive system of FIG. 1, such a situation would arise when the gear box 14 and wheel box 22 are mounted first and the drive shaft 18 has to be inserted between them. The drive coupler 10 permits this to be done through the following assembly sequence. Two of the first connector elements 28 are attached to the ends of the drive shaft 18 by inserting the shaft into the socket 38 and placing the cross pin 40 through holes 42. This locks the cross pieces 28 on the shaft 18.

Two of the second connector elements 30 are prepared by sliding a wear pad 70 onto each of the anchors 68. The second connector elements are then placed over the first connector elements such that the cross piece 28 fits into the housing 54 with the splines of one element engaging the grooves of the other as best seen in FIG. 3. That is, splines 66 of housing 54 fit into the grooves 52 of the cross piece 28 and the splines 44 of the cross piece fit into the spaces between the pads 70. The stop 36 of the cross piece 28 will engage the pads 70 to prevent them from working off of the anchors 68.

With the first and second connector elements 28 and 30 interlocking with one another and attached to the ends of the drive shaft 18, the assembly can be placed between the gear box 14 and wheel box 22. Considering the coupler near the wheel box, the shaft 18 is lifted transversely to shaft 20 so that shaft 20 settles into the pocket 80 of the sill 76. Then the shaft 20 is rotated so its bore aligns with the bore 82 in sill 76. Next the clamp 84 is placed over shaft 20. This is done by first tipping the clamp as shown in phantom in FIG. 2. Tipping the clamp allows the lug 94 to clear the top edge 64 of aperture 60. The clamp is then rotated as indicated by the arrow in FIG. 2. As the clamp rotates it can also slide (to the right in FIG. 2) to fully seat the lug 94 in the aperture 60 in an interference fit. Bevel 90 provides clearance from the ledge 78 as this movement proceeds. Once the groove 92 of the clamp engages the shaft 20, the retention bolt 98 is placed through bore 82, shaft 20 and bore 96. Tightening the nut 104 locks the second connector element 30 onto shaft 20. The clamp and sill fit tightly about shaft 20. The clearance for the bolt 98 in bores 82 and 96 is minimized so that the bolt is not subjected to backlash that could otherwise lead to premature fatigue failure of the bolt.

It will be understood that in cases where shaft 18 has sufficient flexibility it may be possible to connect a coupler at one end of the shaft 18 first and then finish the connection at the other end. Alternately, both ends of the shaft 18 could be lifted into place and clamped onto their respective adjoining shafts simultaneously. The important point is the couplers 10 allow the shaft 18 to be lifted into position even though the axial position of shafts 16 and 20 is essentially fixed. Some axial adjustment of the length of the drive train is afforded by varying the depth to which the cross piece 28 extends into the housing 54.

One of the advantages of the coupler of the present invention is the single bolt locking method. Only bolt 98 is required to lock the clamp 84 on the sill. This reduces the number of parts and allows for relatively quick installation of the coupler.

While a preferred form of the invention has been shown and described, it will be realized that alterations and modifications may be made thereto without departing from the scope of the following claims.

What is claimed is:

1. A coupler for connecting first and second shafts such that rotational motion of the first shaft is transferred to the second shaft, comprising:
 a first connector element engageable with an end of the first shaft;
 a second connector element interengaging with the first connector element in rotationally-driving relation and having a sill defining a pocket into which an end portion of the second shaft can be placed by non-axial relative movement between the sill and second shaft, the second connector defining an aperture having a top edge; and a clamp member being radially and axially split from the second connector element and having a lug which engages the top edge of the second connector so that the clamp member is engageable with the sill to enclose the end portion of the second shaft and fix it in rotationally-driving relation with the second connector element.

2. The coupler of claim 1 wherein each of the first and second connector elements includes a plurality of splines defining grooves therebetween with the splines of one connector element being received in the grooves of the other connector element.

3. The coupler of claim 2 wherein each connector element has a body and the splines each extend from a root connected to the body to a free end.

4. The coupler of claim 3 wherein on one connector element the spline roots are closer to one of the first and second shafts than the free ends while on the other connector element the spline free ends are closer to the other of the first and second shafts than the roots.

5. The coupler of claim 2 wherein sufficient clearance is provided between the splines and grooves and at least one connector element includes a taper on each spline free end to permit the shafts to rotate even if misaligned by about three to five degrees angularity.

6. The coupler of claim 1 wherein one of the connector elements comprises a generally cylindrical female body disposed about the shafts and defining a cavity with radially-directed splines extending from the body into the cavity.

7. The coupler of claim 6 wherein the body further comprises a wall enclosing one end of the body with the sill connected to the wall.

8. The coupler of claim 7 wherein the wall defines the aperture with the top edge for receiving the lug.

9. The coupler of claim 1 further comprising a fastener for retaining the clamp on the sill.

10. A coupler for connecting first and second shafts, comprising:

a first connector element having a body engageable with an end of the first shaft;

a second connector element having a generally cylindrical housing at least partially surrounding the body, the housing defining a unitary radial opening into which the first connector is slidably insertable sufficient to interengage the first and second connector elements together in rotationally-driving relation;

a sill attached to the housing and defining a pocket into which an end portion of the second shaft can be placed by non-axial relative movement between the sill and second shaft; and a clamp member being radially and axially split from the second connector element and being engageable with the sill to enclose the end portion of the second shaft and fix it in rotationally-driving relation with the second connector element.

11. The coupler of claim 10 wherein each of the first and second connector elements includes a plurality of splines defining grooves therebetween with the splines of one connector element being received in the grooves of the other connector element.

12. The coupler of claim 11 wherein the splines each extend from a root to a free end, the spline root of the first connector element being connected to the body and the spline root of the second connector element being connected to the housing.

13. The coupler of claim 12 wherein on one connector element the spline roots are closer to one of the first and second shafts than the free ends while on the other connector element the spline free ends are closer to the other of the first and second shafts than the roots.

14. The coupler of claim 13 wherein said other of the connector elements comprises the generally cylindrical housing disposed about the shafts and defining the unitary radial opening with radially-directed splines extending from the housing into the unitary radial opening.

15. The coupler of claim 10 wherein sufficient clearance is provided between the splines and grooves and at least one connector element includes a taper on each spline free end to permit the shafts to rotate even if misaligned by about three to five degrees angularity.

16. The coupler of claim 10 wherein the generally cylindrical housing further comprises a wall enclosing one end of the housing.

17. The coupler of claim 16 wherein the clamp has a lug extending therefrom and the wall has an aperture for receiving the lug.

18. A coupler for connecting first and second shafts in rotationally-driving relation, comprising:

first and second connector elements engageable with facing ends of the first and second shafts, one of the connector elements being axially slidable onto one of the first and second shafts and the other connector element being transversely movable onto the other of the first and second shafts, the first and second connector elements being matingly engageable with each other with one connector element being axially insertable into the other connector element, at least one connector element includes at least one taper to form a yieldable interlock there-between which allows the coupler to operate under conditions having slight misalignments between the shafts; and a clamp engageable with said other connector element to retain it on its shaft.

19. The coupler of claim 18 wherein one of the first and second connector elements has a generally cylindrical housing defining a unitary radial opening.

20. The coupler of claim 19 wherein the generally cylindrical housing further comprises a wall enclosing one end of the housing.

21. The coupler of claim 20 wherein the clamp has a lug extending therefrom and the wall has an aperture for receiving the lug.

* * * * *